(12) United States Patent
Volpi-Crawford

(10) Patent No.: US 11,307,401 B1
(45) Date of Patent: Apr. 19, 2022

(54) MIRROR MAGNIFYING ATTACHMENT SHEET APPARATUS

(71) Applicant: Sheri Volpi-Crawford, Safford, AZ (US)

(72) Inventor: Sheri Volpi-Crawford, Safford, AZ (US)

( * ) Notice: Subject to any disclaimer, the term of this patent is extended or adjusted under 35 U.S.C. 154(b) by 0 days.

(21) Appl. No.: 17/064,265

(22) Filed: Oct. 6, 2020

(51) Int. Cl.
*G02B 25/00* (2006.01)

(52) U.S. Cl.
CPC ................................. *G02B 25/005* (2013.01)

(58) Field of Classification Search
CPC ...... G02B 7/04; G02B 25/002; G02B 25/005; G02B 27/025; G02B 27/027
See application file for complete search history.

(56) References Cited

U.S. PATENT DOCUMENTS

| | | | |
|---|---|---|---|
| 3,527,524 A | 9/1970 | Pace | |
| 4,709,657 A | 12/1987 | Gothard | |
| D431,375 S | 10/2000 | Zadro | |
| 6,332,570 B2 | 12/2001 | Frei | |
| 6,985,311 B2 | 1/2006 | Bartone | |
| 7,562,980 B2 | 7/2009 | Rymniak | |
| 9,063,269 B1 * | 6/2015 | Montelongo | ........ B43K 29/003 |
| 9,195,046 B2 | 11/2015 | Fields | |
| 2011/0299168 A1 * | 12/2011 | Combs | ..................... G02B 1/11 |
| | | | 359/601 |

FOREIGN PATENT DOCUMENTS

WO    WO2005106565    11/2005

* cited by examiner

*Primary Examiner* — Joseph P Martinez

(57) ABSTRACT

A mirror magnifying attachment sheet apparatus for magnifying a portion of a mirror includes a magnifier body having a body back side, a body front side, and a body perimeter. The magnifier body is transparent and the body front side is convex to create a magnifying effect. The magnifier body is sufficiently flexible to be rolled for storage and transport. The body back side selectively engages a mirror. A storage tube has an open tube top side to receive the magnifier body. A cap is selectively engageable with the open tube top side of the storage tube.

8 Claims, 5 Drawing Sheets

MIRROR MAGNIFYING ATTACHMENT SHEET APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mirror enhancement devices and more particularly pertains to a new mirror enhancement device for magnifying a portion of a mirror.

(2) Description of Related Art Including Information Disclosed Under 37 CFR 1.97 and 1.98

The prior art relates to mirror enhancement devices. Existing devices typically include mirrors with permanently embedded magnified portions. Other devices utilize an adhesive film that can be applied to a screen of an electronic device. These devices do not provide a portable, reusable solution that can be temporarily applied to any standard mirror.

BRIEF SUMMARY OF THE INVENTION

An embodiment of the disclosure meets the needs presented above by generally comprising a magnifier body having a body back side, a body front side, and a body perimeter. The magnifier body is transparent and the body front side is convex to create a magnifying effect. The magnifier body is sufficiently flexible to be rolled for storage and transport. The body back side is configured to selectively engage a mirror. A storage tube has an open tube top side to receive the magnifier body. A cap is selectively engageable with the open tube top side of the storage tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
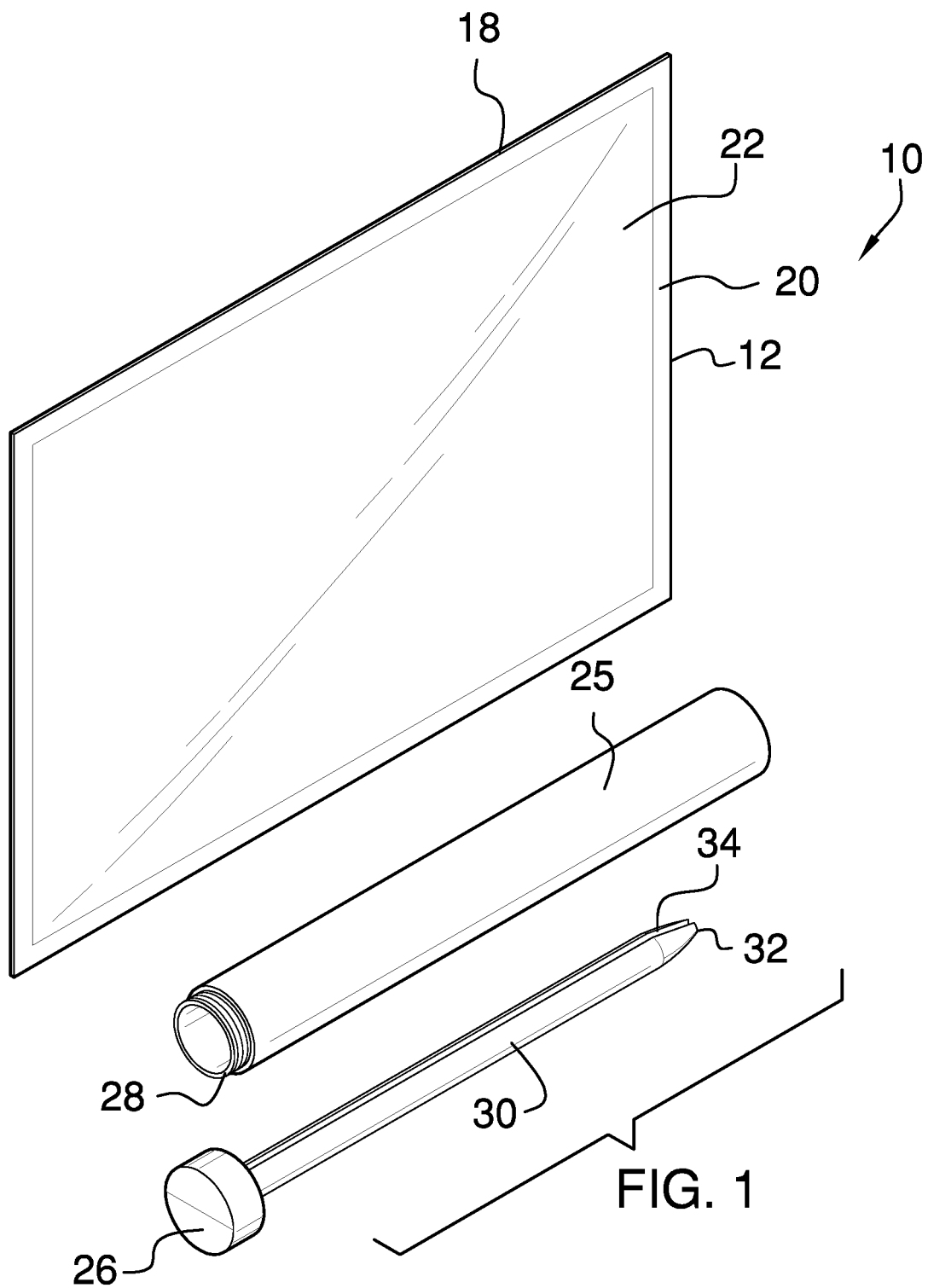
FIG. 1 is an isometric view of a mirror magnifying attachment sheet apparatus according to an embodiment of the disclosure.
Figure 2:
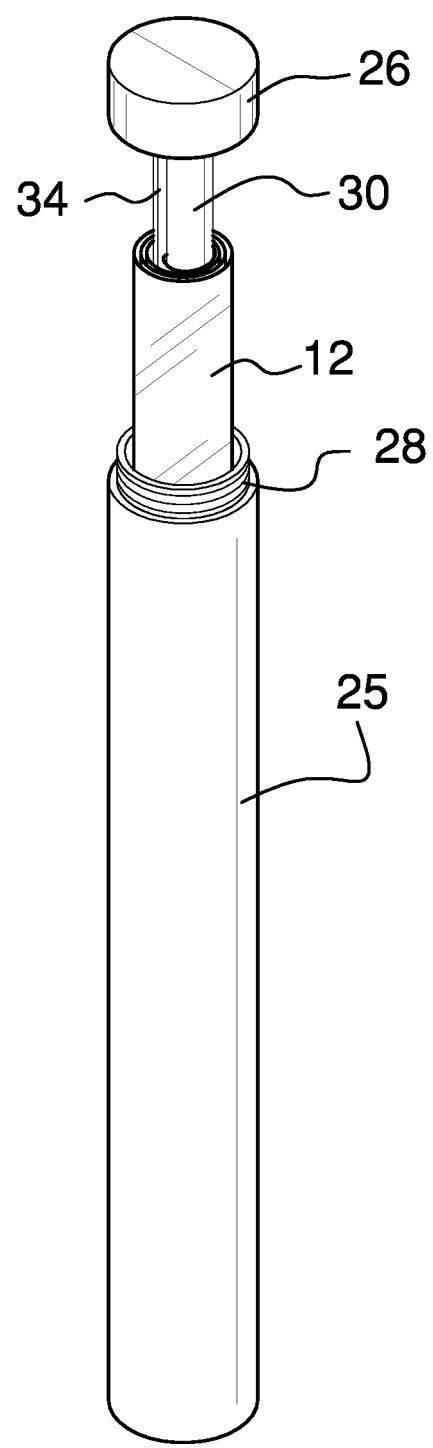
FIG. 2 is an isometric view of an embodiment of the disclosure.
Figure 3:
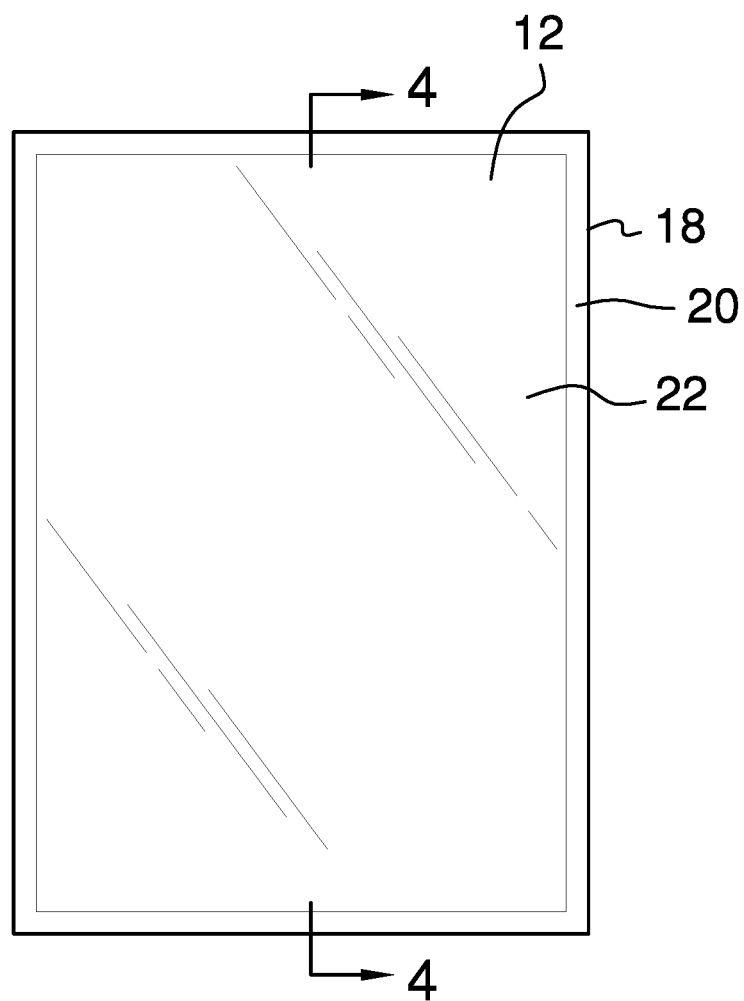
FIG. 3 is a front elevation view of an embodiment of the disclosure.
Figure 4:
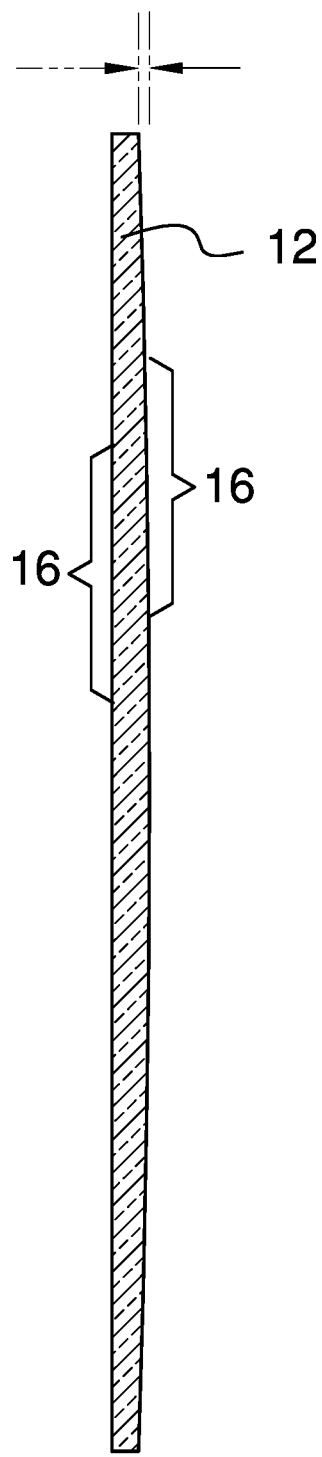
FIG. 4 is a cross-sectional view of an embodiment of the disclosure along the line 4-4 of FIG. 3.
Figure 5:
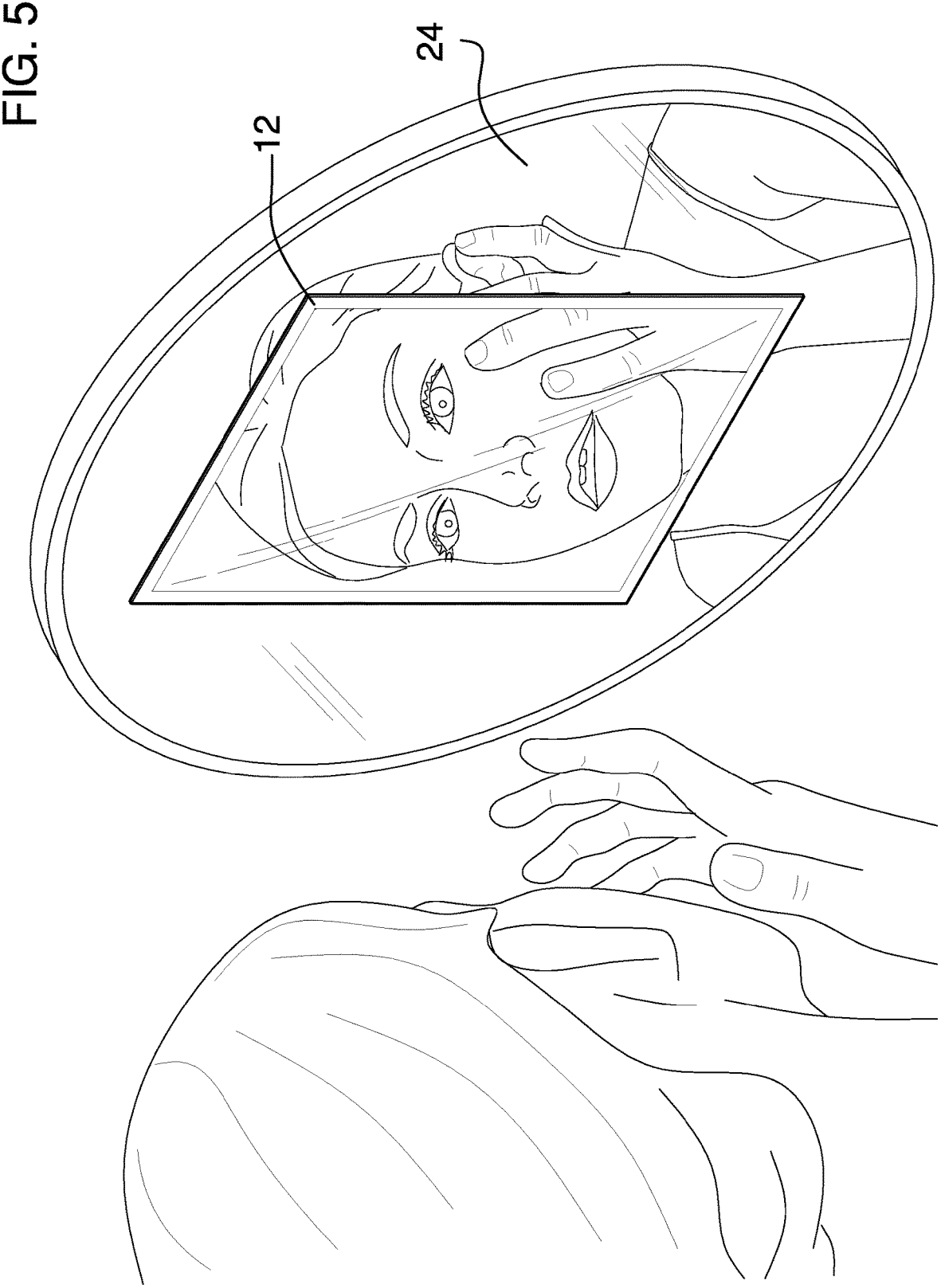
FIG. 5 is an in-use view of an embodiment of the disclosure.

With reference now to the drawings, and in particular to FIGS. 1 through 5 thereof, a new mirror enhancement device embodying the principles and concepts of an embodiment of the disclosure and generally designated by the reference numeral 10 will be described.

As best illustrated in FIGS. 1 through 5, the mirror magnifying attachment sheet apparatus 10 generally comprises a magnifier body 12 having a body back side 14, a body front side 16, and a body perimeter 18. The magnifier body 12 is fully transparent. The body front side 16 may have a flat border portion 20 and a central convex portion 22. The body front side 16 may alternatively be fully convex, or there may be a convex lens disposed between the body back side 14 and the body front side 16. The central convex portion 22 is convex to create a magnifying effect. Depending on the thickness of the magnifier body 12 and curvature of the central convex portion 22 the level of created magnification can be varied.

The magnifier body 12 is sufficiently flexible to be rolled for storage and transport. The body back side 14 is configured to selectively engage a mirror 24. The body back side 14 may cling to the mirror 24 with static electricity or with suction. Alternatively, an adhesive may be distributed on the body back side 14, particularly behind the border portion 20.

A storage tube 25 has an open tube top side 28 to receive the magnifier body 12 once it has been rolled. A cap 26 is selectively engageable with the open tube top side 28 of the storage tube. The cap 26 and the open tube top side 28 may be threaded.

A holding clip 30 may be coupled to the cap 26. The holding clip 30 may have a tapered distal end 32 for easier insertion into the storage tube 26. The holding clip 30 has a pinch slot 34 extending from adjacent the cap 26 through the tapered distal end 32. The pinch slot 34 secures the body perimeter 18 of the magnifier body and allows the magnifier body 12 to be rolled around the holding clip 30. The holding clip 30 extends into the storage tube 25 when the cap 26 is engaged with the open tube top side 28.

In use, the body back side 14 is engaged with the mirror 24. The central convex portion 22 then creates a magnified viewing area for makeup application, shaving, or general self-inspection. When done, the mirror body 12 is removed from the mirror 24 and engaged with the pinch slot 34 and wrapped around the holding clip 30. The cap 26 is engaged with the open tube top side 28 to fully seal and protect the mirror body 12 within the storage tube 25.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mirror magnifying attachment sheet apparatus comprising:
    a magnifier body having a body back side, a body front side, and a body perimeter, the magnifier body being transparent and the body front side being convex to create a magnifying effect, the magnifier body being sufficiently flexible to be rolled for storage and transport;
    wherein the body back side is configured to selectively engage a mirror; and
    a storage tube, the storage tube having an open tube top side to receive the magnifier body;
    a cap, the cap being selectively engageable with the open tube top side of the storage tube; and
    a holding clip coupled to the cap, the holding clip having a pinch slot to secure the body perimeter and allow the magnifier body to be rolled around the holding clip, the holding clip extending into the storage tube when the cap is engaged with the open tube top side.

2. The mirror magnifying attachment sheet apparatus of claim 1 further comprising the body back side clinging to the mirror with static electricity.

3. The mirror magnifying attachment sheet apparatus of claim 1 further comprising the body back side clinging to the mirror with suction.

4. The mirror magnifying attachment sheet apparatus of claim 1 further comprising the body front side having a flat border portion and a central convex portion.

5. The mirror magnifying attachment sheet apparatus of claim 1 further comprising the holding clip having a tapered distal end.

6. The mirror magnifying attachment sheet apparatus of claim 5 further comprising the pinch slot extending from adjacent the cap through the tapered distal end.

7. The mirror magnifying attachment sheet apparatus of claim 1 further comprising the cap and the open tube top side being threaded.

8. A mirror magnifying attachment sheet apparatus comprising:
    a magnifier body having a body back side, a body front side, and a body perimeter, the magnifier body being transparent, the body front side having a flat border portion and a central convex portion, the central convex portion being convex to create a magnifying effect, the magnifier body being sufficiently flexible to be rolled for storage and transport;
    wherein the body back side is configured to selectively engage a mirror, the body back side clinging to the mirror with static electricity or with suction; and
    a storage tube, the storage tube having an open tube top side to receive the magnifier body;
    a cap, the cap being selectively engageable with the open tube top side of the storage tube, the cap and the open tube top side being threaded; and
    a holding clip coupled to the cap, the holding clip having a tapered distal end and a pinch slot extending from adjacent the cap through the tapered distal end, the pinch slot securing the body perimeter and allowing the magnifier body to be rolled around the holding clip, the holding clip extending into the storage tube when the cap is engaged with the open tube top side.

\* \* \* \* \*